(12) United States Patent
Rueger et al.

(10) Patent No.: US 6,380,659 B2
(45) Date of Patent: Apr. 30, 2002

(54) METHOD AND DEVICE FOR CONTROLLING A CONTROLLER HAVING A CAPACITIVE ELEMENT

(75) Inventors: Johannes-Jörg Rueger, Vaihingen/enz; Wolfgang Ruehle, Ditzingen; Hubert Stier, Asperg; Matthias Boee, Ludwigsburg; Guenther Hohl, Stuttgart; Udo Schulz, Vaihingen/enz; Norbert Keim, Loechgau, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/729,056

(22) Filed: Dec. 4, 2000

(30) Foreign Application Priority Data

Dec. 3, 1999 (DE) .......................... 199 58 406

(51) Int. Cl.⁷ ................................. H02N 2/06
(52) U.S. Cl. ................................. 310/316.03
(58) Field of Search ............... 310/316.03, 317, 310/319

(56) References Cited

U.S. PATENT DOCUMENTS

| | | | | |
|---|---|---|---|---|
| 3,569,663 A | * | 3/1971 | Weman ...................... | 219/127 |
| 4,008,430 A | * | 2/1977 | Blum ......................... | 324/15 |
| 5,130,598 A | * | 7/1992 | Verheyen et al. ...... | 310/316.03 |
| 5,613,778 A | * | 3/1997 | Lawson .................... | 374/170 |

FOREIGN PATENT DOCUMENTS

JP     10-54241    *   2/1998     ............ 310/316.03

* cited by examiner

Primary Examiner—Thomas M. Dougherty
(74) Attorney, Agent, or Firm—Kenyon & Kenyon

(57) ABSTRACT

A method and a device for controlling a controller having a capacitive element. An ohmic resistor is connected in parallel to the capacitive element. The value of the ohmic resistor is determined at certain times, and then the type and/or temperature of the capacitive element is deduced on the basis of the value of the resistor.

8 Claims, 3 Drawing Sheets

METHOD AND DEVICE FOR CONTROLLING A CONTROLLER HAVING A CAPACITIVE ELEMENT

BACKGROUND INFORMATION

There are known methods and devices for controlling a capacitive element, in particular piezoelectric actuators for controlling fuel injection in an internal combustion engine.

The properties of the piezoelectric actuator depend on temperature. Therefore, the temperature of the piezoelectric actuator must be determined. In addition, there are deviations in the properties of piezoelectric actuators and controllers of the same design. An object of the present invention is to classify piezoelectric actuators and controllers.

In the case of such piezoelectric actuators, in particular when used in an internal combustion engine to control the amount of fuel injected, the situation may occur where the piezoelectric actuator is driven so that it remains in a certain position, e.g., in the case of a fuel control valve, in a position in which there is continuous fuel injection. Then if a change in the charge of the piezoelectric actuator is no longer possible due to a fault, the valve remains in this position with no change. Such safety-critical states are to be avoided with piezoelectric actuators.

SUMMARY OF THE INVENTION

Due to the fact that in the case of a controller having a capacitive element, an ohmic resistor is connected in parallel with the capacitive element, and the value (R) of the ohmic resistor is determined at certain times, and the type and/or temperature of the capacitive element is deduced on the basis of the value of the resistor, it is possible to determine the temperature easily and/or to compensate for the temperature dependence of the controller, to classify piezoelectric actuators and to reliably avoid critical operating states. This procedure is advantageous with all controllers having a capacitive element. It is especially advantageous with piezoelectric actuators.

It is especially advantageous if the value (R) of the ohmic resistor which is connected in parallel to the capacitive element is determined at certain times and then the temperature of the capacitive element and/or controller is deduced on the basis of this value.

It is especially advantageous that various objects can be achieved at the same time by means of this resistor.

It is advantageous if the value (R) of the ohmic resistor which is connected in parallel to the capacitive element is determined at certain times, and then the type and temperature of the capacitive element and/or controller are deduced on the basis of this value. In particular, the ohmic resistor is used both for classification and for temperature determination.

It is advantageous if the value (R) of the ohmic resistor which is connected in parallel to the capacitive element and functions as a discharge resistor is determined at certain times and then the type of capacitive element and/or controller is deduced on the basis of this value. In particular, the ohmic resistor is used both as a discharge resistor and for classification.

It is advantageous if the value (R) of the ohmic resistor which is connected in parallel to the capacitive element and functions as a discharge resistor is determined at certain times and then the temperature of the capacitive element and/or controller is deduced on the basis of this. In particular, the ohmic resistor is used both as a discharge resistor and for the determination of temperature.

Due to the fact that the ohmic resistor functions as a discharge resistor, controlled discharging of the capacitive element is possible. In particular, in the case when the controller is used as an injector for injecting fuel into an internal combustion engine, critical operating states can be avoided in this way.

This yields an especially simple method of calculating the value of the resistor due to the fact that resistance is calculated on the basis of a discharge time of the capacitive element. To do so, the capacitive element is charged to a voltage and then discharged across the ohmic resistor.

If the value of the resistor is determined on the basis of a test current and/or a test voltage, then the value can be corrected constantly in ongoing operation without any negative effect on the resistance of the controller.

It is especially advantageous if the value of the resistor is determined before starting operation of the controller for the first time.

Such an initial startup occurs at the end of the production line or after repair and/or replacement of the controller.

DETAILED DESCRIPTION

Figure 1:
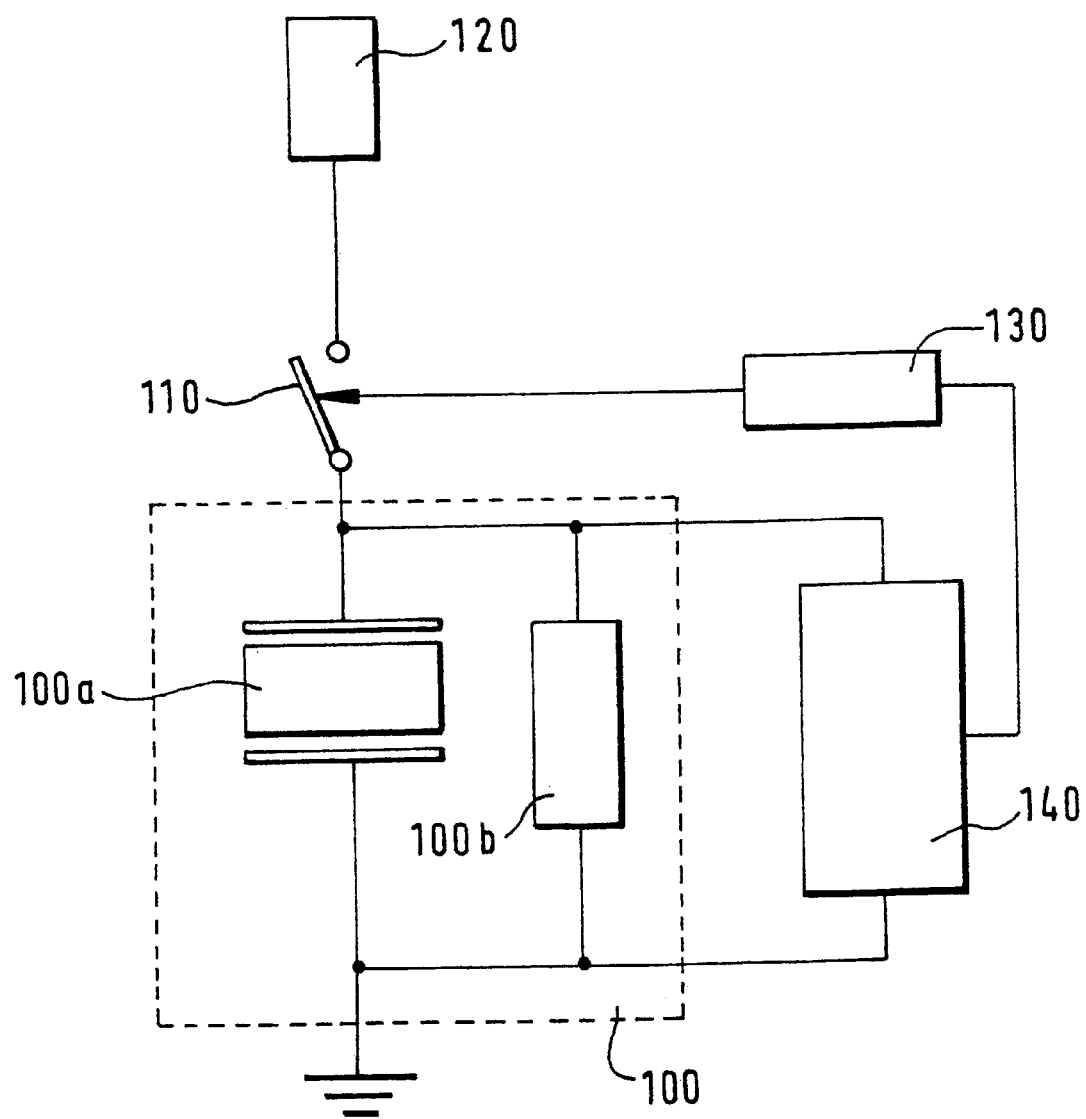
FIG. 1 shows a block diagram of the device according to the present invention.

FIG. 1 shows a controller 100 having a capacitive element. Such controllers are often also referred to as injectors and are used for injecting fuel into an internal combustion engine, for example. There is a certain relationship between the manipulated variable, i.e., the change in length of the capacitive element, and the applied voltage.

For simplification, the mechanical components are not shown, and only capacitive element 100a is shown. It is connected to ground by a first terminal and to an output stage switch 110 by a second terminal. Output stage switch 110 connects the second terminal of the capacitive element to a power supply 120. Output stage switch 110 receives control signals from a control unit 130. An ohmic resistor 100b is connected in parallel to capacitive element 100a. Capacitive element 100a, ohmic resistor 100b and controller 100 preferably form a structural unit. In addition, an analyzer 140 is connected in parallel to capacitive element 100a and ohmic resistor 100b. This analyzer exchanges various quantities with control unit 130.

Power supply 120 and output stage switch 110 are indicated only schematically. Thus, the output stage switch, for example, may be formed by a plurality of switch elements. The output stage switch may preferably also be arranged between the capacitive element and ground.

Such capacitive elements are often also referred to as piezoelectric actuators.

Through appropriate control of output stage switch 110, capacitive element 100a is charged to a certain voltage and then discharged again. The period of time during which the capacitive element is at a certain voltage level, i.e., a certain voltage is being applied to capacitive element 100a, is usually referred to as the control period. The amount of fuel to be injected is determined by this control period. Output stage switch 110, power supply 120 and control unit 130 as well as analyzer 140 are usually combined into one control gear which is arranged separately from the controller. The control gear and the controller are connected by lines. The control gear preferably also includes additional elements and is used preferably to control the internal combustion engine and/or to control the fuel injection into the internal combustion engine. To do so, the control gear processes various quantities and/or output signals from sensors.

In the case of an interruption in the line or a malfunction of one of the components, a situation may occur where the controller is constantly in one certain position because the controller is no longer being discharged or it cannot be discharged any longer. To permit a suitable discharge of the capacitive element in this case, resistor 100b is connected in parallel to capacitive element 100a according to the present invention. The resistor is then in physical proximity to the capacitive element, preferably arranged in the injector, so that the connecting lines are as short as possible.

The resistor is of a size such that the time constant of the RC member resulting from capacitive element 100a and ohmic resistor 100b is so great that there is no significant discharging of the capacitive element within the usual control period which is customary for fault-free injection. On the other hand, the time constant is such that the capacitive element is adequately discharged within the maximum period of time available until the valve must be securely closed in order not to damage the engine. If suitably dimensioned, resistor 100b functions as a discharge resistor.

Within a discharge time that is determined essentially by the time constant, capacitive element 100a has discharged to the extent that the controller assumes a secure position, i.e., injection is stopped. The time constant is selected so that the discharge time is longer than the maximum possible control period of the controller. In the case of a fault, this maximum possible control period is exceeded.

Manufacturing tolerances usually occur in manufacturing injectors, leading to a scattering in amounts, i.e., different injectors apportion different amounts of fuel within the same control period. Due to the fact that the injectors are measured and classified at the time of manufacture, and this classification is taken into account in the control, the yield (rejects) in production can be greatly reduced. In addition, injection is improved because the scattering can be taken into account.

The time constant of the RC element composed of capacitive element 100a and resistor 100b is variable over a certain range. This degree of freedom is utilized according to the present invention to classify the injectors. This is done by determining a certain number of classes which are classified on the basis of this resistor. The resistor is preferably installed again finally after the measurement and mounted so that it cannot be removed easily. For example, the resistor may be surrounded by a material that solidifies. The classification resistor is thus permanently connected to the actuator. For the automotive manufacturer that installs the actuators, this greatly reduces the outlay with regard to costs and logistics as well as the possibilities for faults.

According to the present invention, the resistance value is measured at the start of the system. One possibility of measuring the resistance value is to charge the actuator to any desired voltage and measure the subsiding voltage. The system composed of resistor 100b and capacitive element 100a has a time constant which depends on the value of resistor 100b. This measurement is preferably performed at the end of the production line at the automotive manufacturer's plant, because in this case the initialization time is not critical. Only after successful measurement of the resistor and thus the classification of the injector is control by the control unit enabled.

It is especially advantageous if the state where the resistance has already been measured is stored in a first memory cell of a nonvolatile memory of the control gear so that with any further startup, the resistance need not be measured again. An EEPROM is preferably used as the nonvolatile memory. The result of the classification is also preferably stored in a second memory cell of the nonvolatile memory.

If the actuator is replaced, the value of the first memory cell indicating that the resistance has already been measured is reset to be able to perform a new classification.

Figure 2:
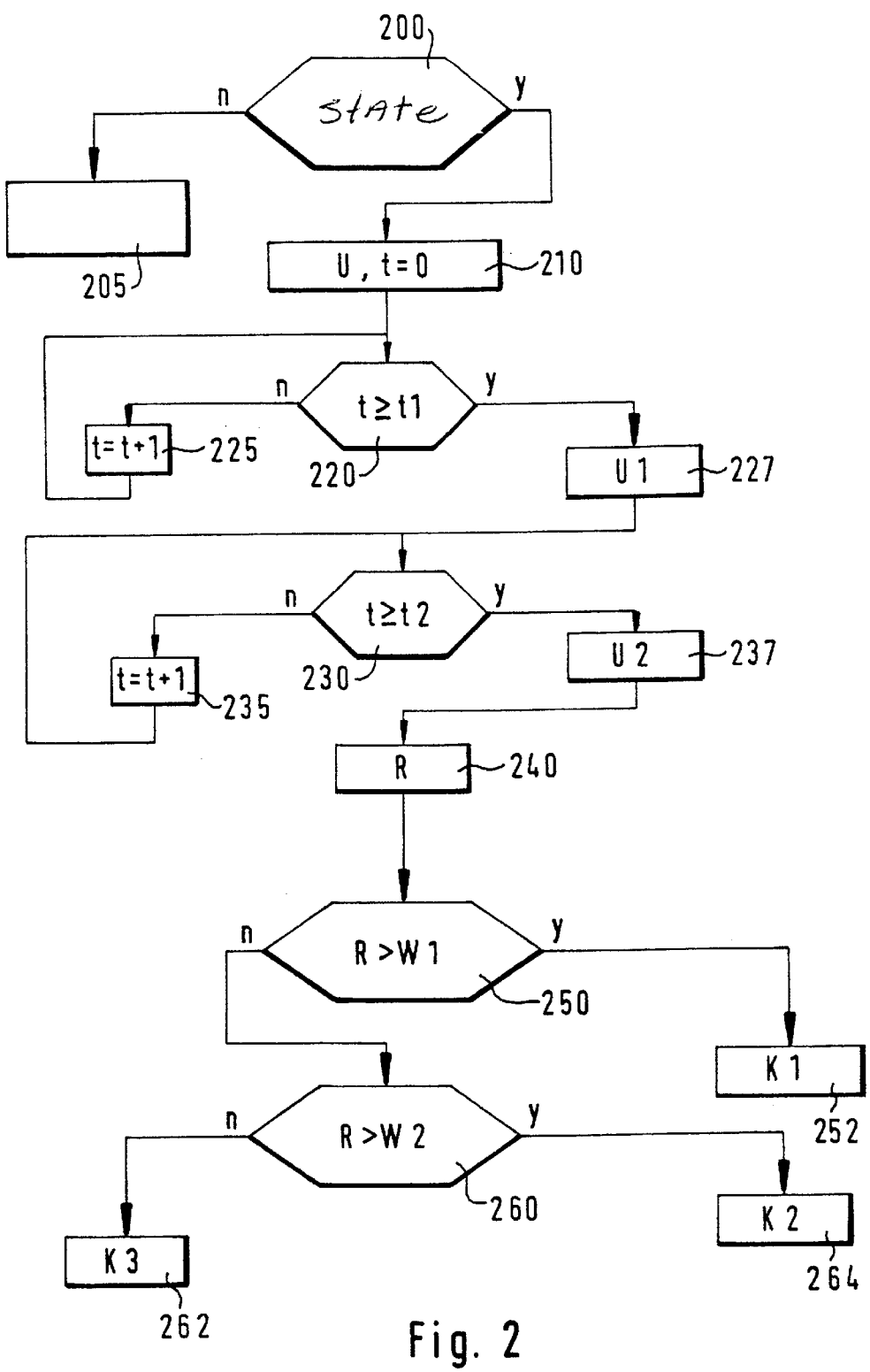
FIG. 2 shows a first flow chart.

FIG. 2 shows both a method for determining value R of resistor 100b as well as a method of determining the class on the basis of the value of the resistor.

In a first step 200, a check is performed to determine whether value R of the resistor is to be determined. In a simple embodiment, a check is performed to determine whether the first memory cell assumes a corresponding value in the nonvolatile memory indicating whether the resistance has not been determined yet. If this is not the case, i.e., if value R of the resistor has already been determined, then the program goes to step 205 in its usual program sequence.

If value R of the resistor has not yet been determined, then in step 210, the capacitive element is charged to a defined voltage U. At the same time, a time meter t is set to zero. Subsequent query 220 determines whether the value of time meter t is greater than or equal to a time threshold t1. If this is not the case, the time meter is incremented in step 225, and a query 220 is again performed. If time meter t is greater than or equal to time threshold t1, then in step 227 the voltage U1 at this time is measured.

Next in step 230, the query determines whether the content of time meter t is equal to or greater than a second time threshold t2. If this is not the case, then in step 235, time meter t is incremented by 1. If this is the case, then in step 237 the value U2 of the voltage at time t2 is determined.

In the case of an RC element, the voltage drops according to an exponential function which is determined essentially by a time constant. By measuring the voltage at two different times, the time constant can be determined, and thus in the case of a known capacitance of capacitive element 100a, value R of the resistor can be determined. This calculation of the value of the resistor is performed in step 240.

Subsequent query 250 determines whether value R of the resistor is greater than a threshold value W1. If this is the case, the injector is put in class K1 in step 252. If this is not the case, query 260 determines whether value R of the resistor is greater than a second threshold value W2. If this is the case, then the injector is classified in class K2 in step 264. If this is not the case, the injector is classified in class K3 in step 262.

In the embodiment illustrated here, the injectors are classified in three classes. The procedure according to the present invention is not limited to three classes as the number of classes, but it may also be used with any desired number of classes.

It is especially advantageous if the resistor is in thermal contact with the capacitive element. In this case, the temperature of the ceramic material of the actuator and/or the injector can be determined by means of resistor 100b. By using a test current with which resistor 100b is cycled continuously or receives current at certain intervals, the resistance can be determined on the basis of Ohm's law. In this case, the current is measured with a voltage which is preferably known and/or measured.

In the case of a piezoelectric actuator having a resistor, it is possible to determine the instantaneous temperature of the actuator or the injector on the basis of resistor 100b. Starting with the known relationships between the change in length and the temperature and/or the relationship between the change in length and the voltage applied to the piezoelectric actuator, the influence of temperature on the change in length can be corrected by correcting the voltage. Through appropriate correction of the voltage as a function of the resistance value (R) of resistor 100b, a constant valve displacement over the entire temperature range is achieved.

Figure 3:
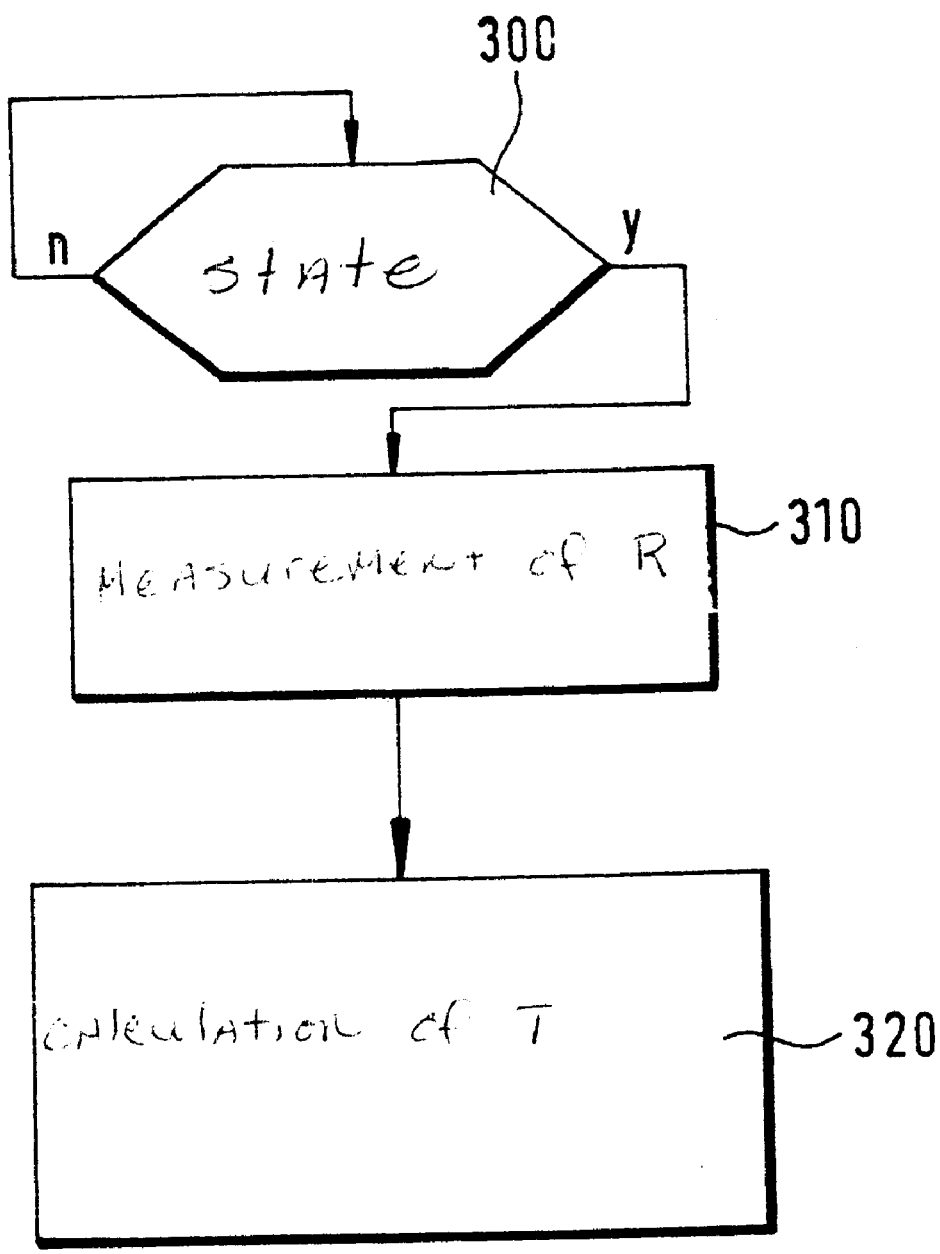
FIG. 3 shows a second flow chart of the procedure according to the present invention.

A corresponding procedure is illustrated in FIG. 3. In a first step 300, a check is performed to determine whether the prevailing state is one in which a measurement of temperature is possible. In the simplest embodiment, the measurement is performed at fixed predetermined intervals. In step 310, resistor 100b receives a test current and the falling voltage is measured. As an alternative, a voltage may also be applied to the resistor and the current measured. Then using these values, value R of resistor 100b is obtained. Temperature T is calculated on the basis of value R.

The resistor is preferably designed as a high-resistance wire which is arranged on the outside of the ceramic. In addition, it may also be integrated into the ceramic in the production of the ceramic. In the case of a stacking actuator, it is also possible for the resistor to be inserted as an additional disk.

The determination of the resistance according to FIG. 3 and the determination of the resistance according to FIG. 2 may also be exchanged, and other methods may also be used to determine the resistance.

It is especially advantageous that different objects can be achieved with one element which is preferably designed as an ohmic resistor.

It is advantageous if the resistance values in the procedure according to FIG. 2 are selected so that the difference between the resistance values in different classes is greater than the range of variation in the resistance values as a function of temperature.

What is claimed is:

1. A method of controlling a controller having a capacitive element, an ohmic resistor being connected in parallel to the capacitive element, comprising the steps of:

determining a value of the resistor at predetermined times; and determining at least one of a type and a temperature of the capacitive element as a function of the determined value of the resistor.

2. The method according to claim 1, wherein the ohmic resistor functions as a discharge resistor.

3. The method according to claim 1, wherein the value of the resistor is calculated as a function of a discharge time of the capacitive element.

4. The method according to claim 1, wherein the value of the resistor is determined as a function of at least one of a test current and a test voltage.

5. The method according to claim 1, wherein the value of the resistor is determined before a starting operation of the controller for a first time.

6. The method according to claim 1, wherein the value of the resistor is determined a plurality of times during an operation of the controller.

7. The method according to claim 1, further comprising the steps of:

charging the capacitive element to a predetermined voltage; and subsequently discharging the capacitive element across the resistor.

8. A device for controlling a controller having a capacitive element, an ohmic resistor being connected in parallel to the capacitive element, the device comprising:

means for determining a value of the resistor at predetermined times; and means for determining at least one of a type and a temperature of the capacitive element as a function of the determined value of the resistor.

* * * * *